United States Patent [19]

Strefling

[11] 4,297,091
[45] Oct. 27, 1981

[54] ALFALFA PELLETIZING APPARATUS

[76] Inventor: Michael R. Strefling, 425 S. 27th St., South Bend, Ind. 46615

[21] Appl. No.: 129,398

[22] Filed: Mar. 10, 1980

[51] Int. Cl.³ .......................... A01F 29/00; B29J 1/00
[52] U.S. Cl. ..................................... 425/84; 425/231; 425/345; 425/DIG. 116; 425/DIG. 230
[58] Field of Search ............ 425/DIG. 230, 347, 348, 425/329, 331, 6, 84, 345, 353, 231

[56] References Cited

U.S. PATENT DOCUMENTS

| 829,044 | 8/1906 | Wilcox | 425/345 |
| 829,046 | 8/1906 | Wilcox | 425/345 |
| 3,309,750 | 3/1967 | Gally | 425/DIG. 116 |
| 3,317,999 | 5/1967 | Royer et al. | 425/84 |
| 3,430,532 | 3/1969 | Campbell | 425/84 |
| 3,452,393 | 7/1969 | Pierson et al. | 425/DIG. 230 |
| 3,841,817 | 10/1974 | Moldenhauer | 425/DIG. 230 |
| 3,880,566 | 4/1975 | Komarek | 425/331 |
| 3,993,428 | 11/1976 | Gumm et al. | 425/348 R |

Primary Examiner—James H. Derrington
Attorney, Agent, or Firm—Oltsch, Knoblock & Hall

[57] ABSTRACT

Alfalfa pelletizing apparatus and method wherein pellets are formed in an open ended molding passage or aperture by compressing members entering both ends of the aperture to compress the alfalfa and to extract liquid content for discharge at a passage communicating with the mid portion of the primary mold aperture. The mold apertures are formed in a moving belt upon which the alfalfa is discharged. The pellets are expelled from the apertures after formation thereof and the forming apertures are then cleaned after release of the pellets.

8 Claims, 4 Drawing Figures

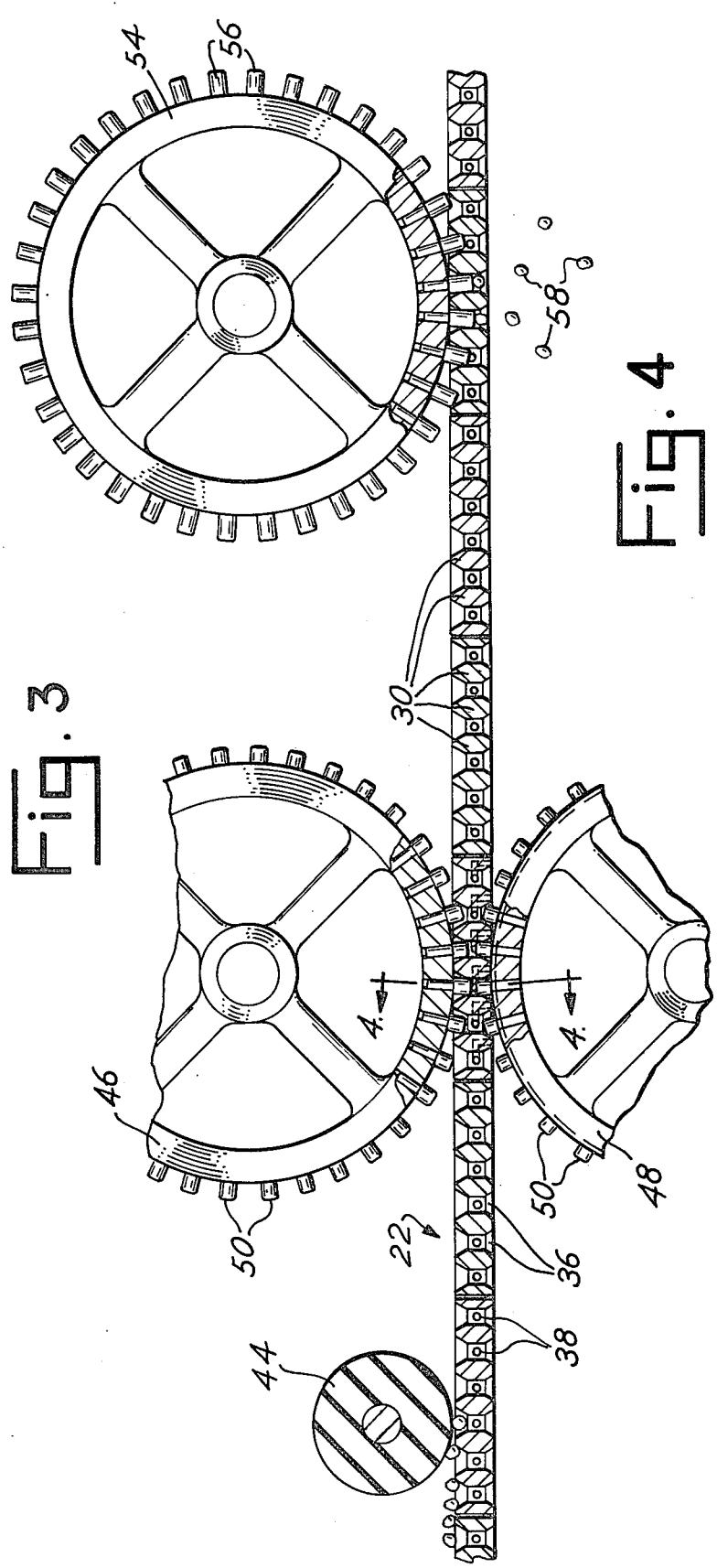
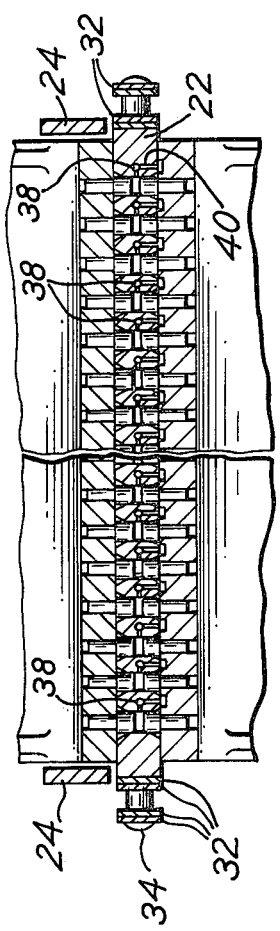

ALFALFA PELLETIZING APPARATUS

SUMMARY OF THE INVENTION

This invention relates to alfalfa pelletizing apparatus and method.

The pelletizing of alfalfa has been proposed as a means to minimize storage space required to preserve alfalfa for use as feed for cattle and other animals and to reduce labor incident to the dispensing or supplying of alfalfa at animal feeding stations. Previous efforts to produce alfalfa pellets have not proven universally successful. One problem encountered previously has been that alfalfa commonly contains a high moisture content which is detrimental to and causes spoilage of the pellets during storage thereof.

It is the primary object of this invention to provide apparatus for pelletizing alfalfa which includes means for extracting excess moisture content of the alfalfa.

A further object is to provide apparatus for pelletizing alfalfa which is simple in construction, easily operated, and produces pellets of substantially uniform moisture content and other properties.

A further object is to provide apparatus for pelletizing alfalfa economically, quickly, and in substantial volume.

Other objects will be apparent from the following specification.

BRIEF DESCRIPTION OF THE DRAWINGS

FIG. 3 is a fragmentary detail enlarged view of a portion of the apparatus as viewed on line 2—2 of FIG. 1.

FIG. 4 is a transverse sectional detail view taken on line 4—4 of FIG. 3.

DESCRIPTION OF THE PREFERRED EMBODIMENT

Figure 1:
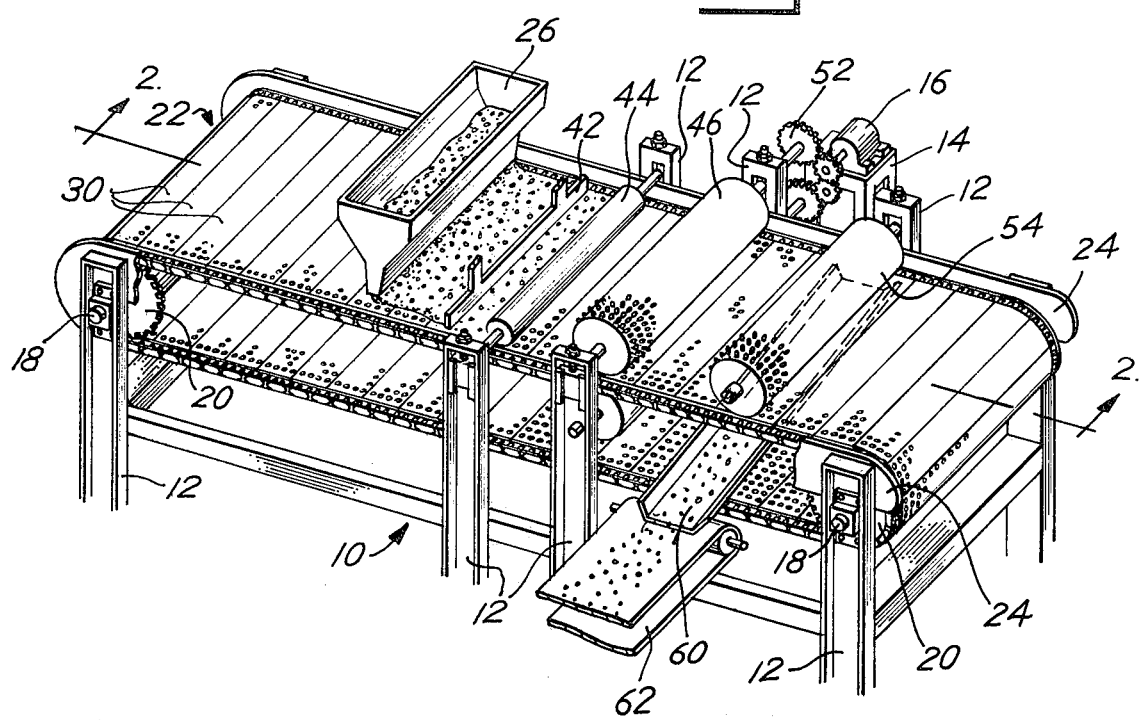
FIG. 1 is a perspective view of the apparatus.

Referring to the drawings which illustrate a preferred embodiment of the invention, the numeral 10 designates a frame of the apparatus having a plurality of upright legs 12 and a lateral projecting portion 14 upon which a drive motor 16 is mounted. At opposite ends of the frame are journaled the shafts 18 which mount sprockets or pulleys 20. Suitable drive means (not shown) interconnect the drive motor 16 and one or both of the shafts 18. An endless belt unit 22 is trained around the sprockets or pulleys 20. Frame 10 includes side panels 24 at opposite sides thereof extending longitudinally of the frame adjacent to the opposite sides of the belt unit 22 and projecting above the upper run of the belt unit 22. A hopper 26 is suitably supported upon the frame adjacent one end thereof and is provided with a restricted bottom opening from which its contents may be progressively delivered at a selected rate correlated with the rate of advance of the belt unit. The hopper contains alfalfa which has been chopped, cut or ground into small particles and mixed with water so that it will readily flow onto the belt unit to be described. A baffle plate 28 is mounted upon the frame to extend from a point below the point of discharge of the hopper for a predetermined distance in the direction of movement of the belt unit 22. The upper run of the belt unit preferably bears upon the baffle plate 28 as the upper run travels away from the hopper.

The belt unit 22 preferably comprises a plurality of elongated flat plates 30 which are hingedly connected along their longitudinal edges, as by means of ears 32 projecting from the ends thereof at the fore and aft end corners thereof and so that the ears of adjacent plates 30 are arranged in lapping relation and are provided with aligned pivot apertures in which pivot pins 34 are mounted as illustrated in FIG. 4. Each of the plates 30 is provided with a plurality of apertures 36 arranged in equi spaced relation in rows extending transversely thereof, i.e. lengthwise of the belt unit. The rows of apertures 36 are close spaced throughout the length of the plates 30 as best seen in FIG. 4. Each plate aperture preferably flares slightly at each end thereof. At the central portion of each aperture is provided a lateral drain aperture 38 which communicates with a drain passage 40 in the adjacent plate portion. The drain passages are positioned so that, in the belt plates 30 in the upper run of the belt, they project downwardly from the adjacent communicating lateral apertures 38.

Frame 10 adjustably mounts a spreader bar or plate 42 at a selected elevation above the belt unit at the downstream side thereof relative to the hopper 26. The spreader plate serves to spread the alfalfa upon the belt to insure uniformity of the alfalfa across the belt unit and into each plate aperture. The spreader plate 42 is preferably located at a point in selected spaced relation to the hopper and above the baffle plate 28.

Figure 2:
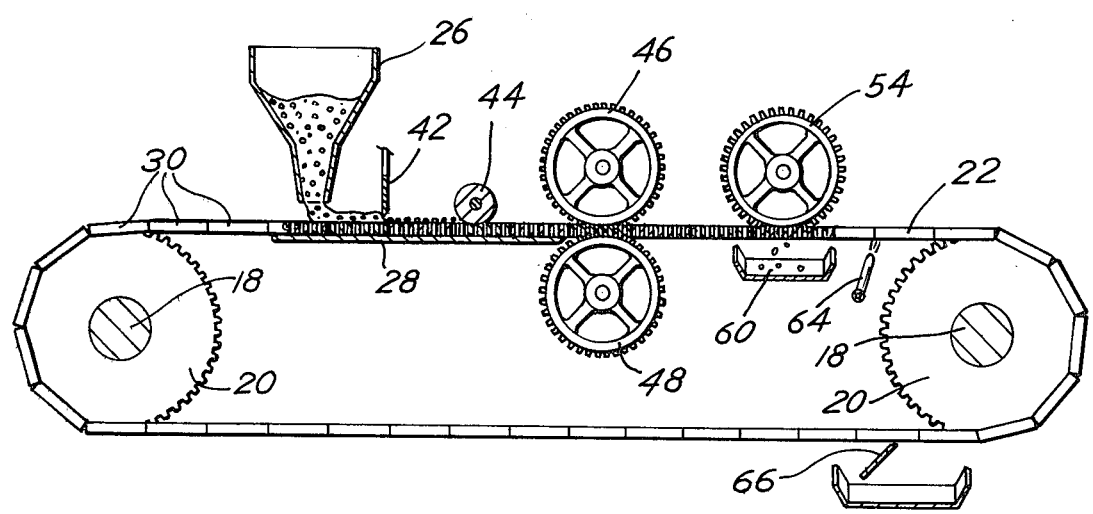
FIG. 2 is a vertical sectional view of a portion of the apparatus taken on line 2—2 of FIG. 1.

A compression roller 44 is journaled by the frame 10 in a downstream position relative to the hopper and the spreader bar and at a position above the baffle plate 28 as best seen in FIG. 2. The compression roller 44 acts to advance the loose alfalfa upon the belt unit 22 into the apertures 36 and to partially compress the alfalfa.

The frame 10 journals the shaft of an upper pelletizing roller 46 and a lower pelletizing roller 48 located at positions adjacent to the downstream end of the baffle plate 28, but clear of that baffle plate. Each of the pelletizing rollers 46-48 has a plurality of radially projecting fingers 50 so positioned and spaced relative to each other as to enter the apertures 36. Each roller is preferably driven by the motor 16 by means of gearing 52, to insure that each finger enters an aperture 36 as the belt unit 22 advances. The entry of the fingers 50 into the apertures 36 of the belt unit 22 is best illustrated in FIG. 3 and is accommodated by the taper of the upper and lower ends of the apertures 36. The entry of fingers 50 of the upper pelletizing roller 46 into belt apertures occurs simultaneously with the entry of the fingers 50 of the lower pelletizing roller 48 into the same belt apertures so as to compress the alfalfa in each aperture between the fingers and within the central portion of each aperture 36. This action serves to expel liquid content of the alfalfa being pelletized for flow into and through the lateral aperture 38 associated with each aperture 36 and for drainage and discharge through the drain opening 40 associated with each belt aperture 36. This action produces a compact pellet in each aperture, and insures that the moisture content of each pellet is substantially less than the moisture content of the alfalfa fed from the hopper 26. Compression of the material being pelletized; applied at the opposite ends of the belt apertures 36, produces a compact pellet having shape retaining properties permitting the pellets to be handled and stored with minimum deterioration or breakage. At the same time the pellets retain all desired properties as food for animals.

Adjacent to and in spaced downstream relation to the pelletizing rollers is located a releasing roller 54 which spans the belt and is suitably journaled upon the frame 10 above the upper run of the belt unit 22. Release roller 54 is provided with a plurality of sets of radial release fingers so oriented and positioned that each aperture 36 of the belt which passes below the release roller is entered by a release finger 56. The release fingers are of such length as to dislodge and release from the apertures 36 of the belt unit the pellet which is lodged in the central portion of each aperture so that the freed pellets 58 fall from the belt unit as seen in FIG. 3 at a release station. The release roller 54 may be driven positively at a speed correlated with the rate of advance of the belt unit or may be free to rotate incident to advance of the belt unit by translation of the advancing movement of the belt to the roller through the interengaging release fingers 56. The frame 10 mounts a pellet discharge chute 60 positioned below the release roller and between the upper and lower runs of the belt unit 22. Chute 60 is preferably inclined sufficiently to convey the pellets 58 to a position laterally of the frame unit, as for deposit upon a conveyor belt 62 so oriented and positioned below the discharge end of the chute 60 as to receive and convey the discharged pellets to a delivery station or collecting station (not shown).

Suitable means are provided to clean the belt at belt apertures as the belt moves away from the release roller 56. One such means is illustrated in FIG. 2 and constitutes a series of spray nozzles 62 projecting from a transverse conduit supported by the frame 10 and connected to a source of cleaning fluid under pressure. As shown in FIG. 2, jets of cleaning fluid are projected against the under surface of the upper run of the belt for entry into the belt apertures 36. The jets are projected at sufficient velocity to insure an effective cleaning of the belt apertures. Alternatively or additionally, spray nozzles may be directed against the lower run of the belt unit 22 as it travels away from the sprockets 20 at the release end of the apparatus and back toward the sprocket or pulley 20 at the opposite end of the apparatus. Also, a scraper 66 carried by the frame 10 may engage the bottom run of the belt to release adhered alfalfa particles for discharge to a collecting chute, or a brush (not shown) may be provided at this point.

The apparatus provides means for the practice of a method of pelletizing alfalfa which has been chopped, cut or ground into small particles and mixed with water to a consistency permitting ready flow thereof through a discharge opening of a hopper. The moistened alfalfa is discharged uniformly and then spread upon a supporting belt unit to uniform depth and then is rolled to partially compact the alfalfa and to force it into close spaced apertures within the belt. The alfalfa in the apertures is then compressed or compacted to the mid portion of each aperture and simultaneously has extracted therefrom the major portion of the contained liquid so as to dry and solidify each pellet. The pellets are then released from the apertures in the upper run of the belt unit for collection upon a chute or belt for delivery to a discharge point. The belt is then subjected to high pressure jets of cleaning liquid and/or a scraper to clean the apertures and to release alfalfa particles upon the face of the belt unit between adjacent apertures and thus prepare each portion of the belt for succeeding pellet forming conditions.

While the preferred embodiment of the invention has been illustrated and described, it will be understood that changes in the construction and method may be made within the scope of the appended claims without departing from the spirit of the invention.

What I claim is:

1. Apparatus for pelletizing small alfalfa particles mixed with water comprising a frame, spaced sprockets journaled on said frame, a belt unit trained around said sprockets, means for driving a sprocket, said belt having a plurality of pellet-forming open ended apertures therein and a drain passage located at the central portion of each aperture, opposed pelletizing rollers journaled on said frame and each including a plurality of pelletizing fingers, each finger being adapted to enter an aperture and cooperate with an opposed finger to compress alfalfa particles in the central portion of the aperture and to expel liquid from said compressed particles and through said drain passage of each aperture, and means for releasing pellets from said apertures at a discharge station.

2. Alfalfa pelletizing apparatus as defined in claim 1, and means for cleaning said belt unit and the apertures thereof after release of pellets by said last named means.

3. Alfalfa pelletizing apparatus as defined in claim 1, wherein said belt apertures are tapered at their opposite ends.

4. Alfalfa pelletizing apparatus as defined in claim 1, wherein said belt unit comprises a plurality of elongated rigid pivotally connected apertured plates extending transversely of said belt.

5. Alfalfa pelletizing apparatus as defined in claim 2 wherein said cleaning means include nozzles for projecting cleaning liquid against said belt under pressure.

6. Alfalfa pelletizing apparatus as defined in claim 1, including a hopper for discharging a fluent mass of alfalfa particles upon said belt unit at a feed station, and a retaining plate underlying the alfalfa receiving run of said belt from said feed station to a position adjacent to said pelletizing rollers.

7. Alfalfa pelletizing apparatus as defined in claim 1, wherein said pellet releasing means includes a roller journaled on said frame and extending across the upper surface of said belt unit and a plurality of substantially radially projecting fingers on said pellet release roller positioned to enter said belt apertures to dislodge pellets therefrom.

8. Alfalfa pelletizing apparatus as defined in claim 7, and an inclined chute extending transversely of said frame to receive pellets released from said belt unit and deliver them to a collection station.

* * * * *